(12) United States Patent
Shen et al.

(10) Patent No.: US 11,120,072 B1
(45) Date of Patent: Sep. 14, 2021

(54) HIGH DIMENSIONAL TO LOW DIMENSIONAL DATA TRANSFORMATION AND VISUALIZATION SYSTEM

(71) Applicant: SAS Institute Inc., Cary, NC (US)

(72) Inventors: Kai Shen, Apex, NC (US); Haoyu Wang, Cary, NC (US); Arin Chaudhuri, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/182,424

(22) Filed: Feb. 23, 2021

Related U.S. Application Data

(60) Provisional application No. 63/090,459, filed on Oct. 12, 2020, provisional application No. 63/056,588, filed on Jul. 25, 2020.

(51) Int. Cl.
| | |
|---|---|
| *G06K 9/00* | (2006.01) |
| *G06F 16/56* | (2019.01) |
| *G06K 9/62* | (2006.01) |
| *G06F 17/16* | (2006.01) |
| *G06F 16/55* | (2019.01) |
| *G06N 20/10* | (2019.01) |

(Continued)

(52) U.S. Cl.
CPC .............. *G06F 16/56* (2019.01); *G06F 16/55* (2019.01); *G06F 17/16* (2013.01); *G06K 9/6247* (2013.01); *G06K 9/6269* (2013.01); *G06N 20/10* (2019.01)

(58) Field of Classification Search
CPC ........... G06K 9/00288; G06K 9/00281; G06K 9/00268; G06K 9/00221; G06K 9/0061; G06K 9/00275; G06K 2009/00328; G06K 9/00248; G06K 9/00302; G06K 9/00664; G06K 9/00677; G06K 9/03; G06K 9/6218; G06K 9/00295; G06K 9/00771; G06K 9/4604; G06K 9/6219; G06K 9/00597; G06K 9/00604; G06K 9/00617; G06K 9/00228; G06K 9/00315; G06K 9/00979; G06K 9/00255; G06K 9/00335;

(Continued)

(56) References Cited

U.S. PATENT DOCUMENTS

2010/0278419 A1* 11/2010 Suzuki .................. G06F 16/739
                                                              382/155

OTHER PUBLICATIONS

Kim, Face Recognition using Kernel Principal Component Analysis, Feb. 2002, IEEE (Year: 2002).* D (Continued)

*Primary Examiner* — Alex Kok S Liew
(74) *Attorney, Agent, or Firm* — Bell & Manning, LLC

(57) ABSTRACT

A computer transforms high-dimensional data into low-dimensional data. (A) A distance matrix is computed from observation vectors. (B) A kernel matrix is computed from the distance matrix using a bandwidth value. (C) The kernel matrix is decomposed using an eigen decomposition to define eigenvalues. (D) A predefined number of largest eigenvalues are selected from the eigenvalues. (E) The selected largest eigenvalues are summed. (F) A next bandwidth value is computed based on the summed eigenvalues. (A) through (F) are repeated with the next bandwidth value until a stop criterion is satisfied. Each observation vector of the observation vectors is transformed into a second space using a kernel principal component analysis with the next bandwidth value and the kernel matrix. The second space has a dimension defined by the predefined number of first eigenvalues. Each transformed observation vector is output.

30 Claims, 12 Drawing Sheets
(2 of 12 Drawing Sheet(s) Filed in Color)

(58) Field of Classification Search
CPC .......... G06K 9/00463; G06K 9/00899; G06K 9/2027; G06K 9/4614; G06K 9/4619; G06K 9/4628; G06K 9/4642; G06K 9/4661; G06K 9/468; G06K 9/527; G06K 9/6215; G06K 9/6217; G06K 9/622; G06K 9/6256; G06K 9/6262; G06K 9/6267; G06K 2009/00939; G06K 9/00234; G06K 9/00261; G06K 9/00496; G06K 9/00684; G06K 9/00791; G06K 9/00885; G06K 9/38; G06K 9/40; G06K 9/6206; G06K 9/6232; G06K 9/6234; G06K 9/6255; G06K 9/629; Y10S 707/915; Y10S 707/99933; Y10S 707/99943; G06F 16/5838; G06F 16/56; G06F 21/32; G06F 16/5854; G06F 21/31; G06F 40/169; G06F 16/40; G06F 16/50; G06F 16/583
See application file for complete search history.

(56) References Cited

OTHER PUBLICATIONS ing, Adaptive kernel principal component analysis, Nov. 2009, Elsevier (Year: 2009).*

Shao, J.-D., G. Rong, and J. M. Lee (2009). Learning a data-dependent kernel function for kpca-based nonlinear process monitoring. Chemical Engineering Research and Design 87 (11), 1471-1480.

Kwok, J. T . and I. W.. Tsang (2004). The pre-image problem in kernel methods. IEEE Transactions on Neural Networks 15(6), 1517-1525.

Choi, S. W. and I.-B. Lee (2004). Nonlinear dynamic process monitoring based on dynamic kernel pca. Chemical engineering science 59 (24), 5897-5908.

Ji, H., X. He, G. Li, and D. Zhou (2016). Determining the optimal kernel parameter in KPCA based on sample reconstruction. In 2016 35th Chinese Control Conference (CCC), pp. 6408{6414. IEEE.

Kai-Xiang, P., K. Zhang, and L. Gang (2014). Online contribution rate based fault diagnosis for nonlinear industrial processes. Acta Automatica Sinica 40 (3), 423-430.

Kitayama, S. and K. Yamazaki (2011). Simple estimate of the width in gaussian kernel with adaptive scaling technique. Applied Soft Computing 11 (8), 4726-4737.

Lee, J.-M., C. Yoo, S. W. Choi, P. A. Vanrolleghem, and I.-B. Lee (2004). Nonlinear process monitoring using kernel principal component analysis. Chemical engineering science 59 (1), 223-234.

Scholkopf, B., Smola, A., and Muller, K.-R. (1997). "Kernel Principal Component Analysis." In Artificial Neural Networks—ICANN '97 (Proceedings of the 7th International Conference), 583-588. Berlin: Springer.

B. Schölkopf et al., Kernel PCA pattern reconstruction via approximate pre-images., published 1998 Computer Science.

* cited by examiner

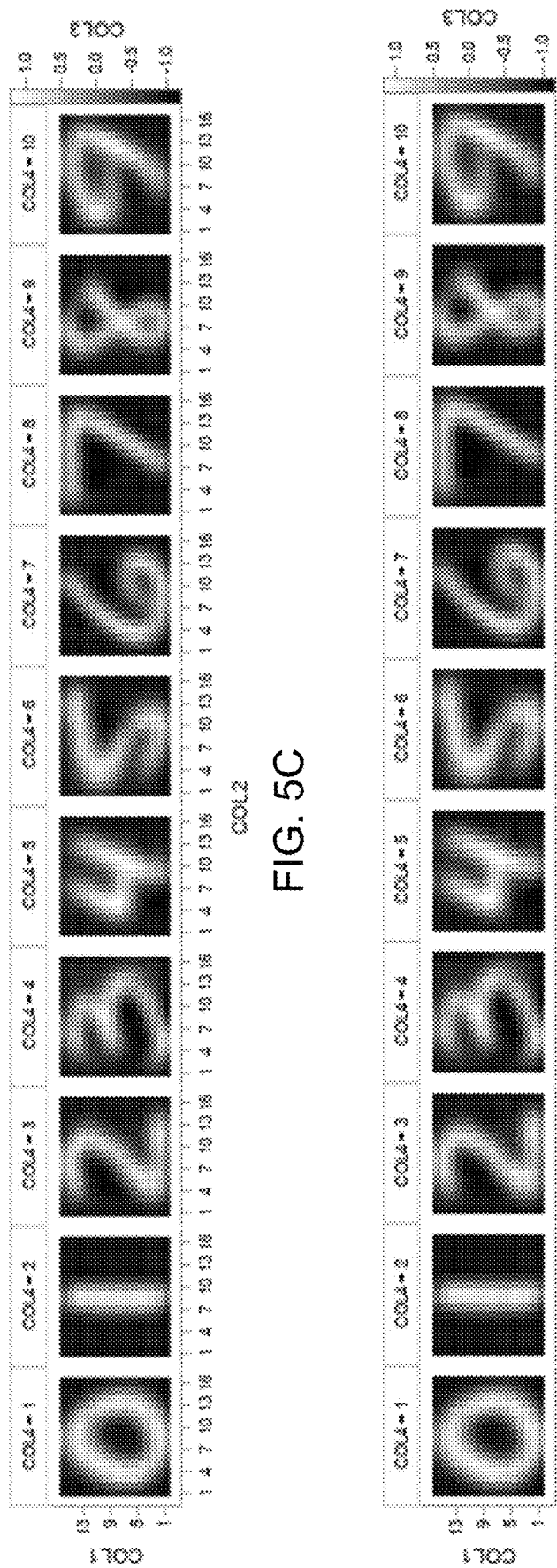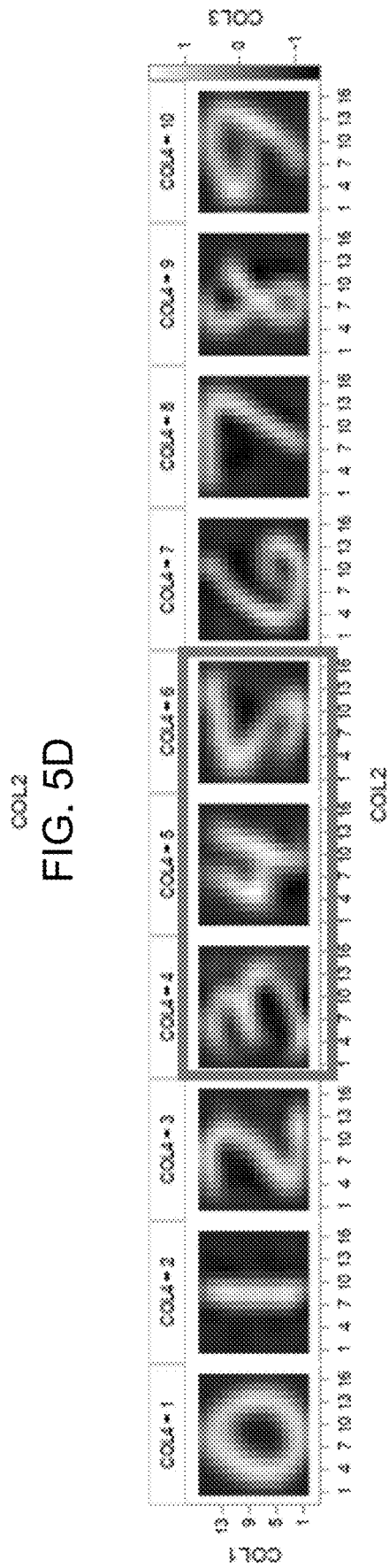
FIG. 5C
FIG. 5D
FIG. 5E

HIGH DIMENSIONAL TO LOW DIMENSIONAL DATA TRANSFORMATION AND VISUALIZATION SYSTEM

CROSS-REFERENCE TO RELATED APPLICATIONS

The present application claims the benefit of and priority under 35 U.S.C. § 119(e) to U.S. Provisional Patent Application No. 63/090,459 filed Oct. 12, 2020, the entire contents of which are hereby incorporated by reference. The present application also claims the benefit of and priority under 35 U.S.C. § 119(e) to U.S. Provisional Patent Application No. 63/056,588 filed Jul. 25, 2020, the entire contents of which are hereby incorporated by reference.

BACKGROUND

Dimension reduction and visualization of high-dimensional data have become important research topics in many scientific fields because of the rapid growth of data sets with large sample size and/or number of dimensions. Kernel principal component analysis (KPCA) has proven to be useful in many applications as a dimension reduction technique. Compared with PCA, KPCA better exploits the complicated spatial structure of high-dimensional features. The value of a kernel function parameter can strongly affect the dimension reduction performance though.

SUMMARY

In an example embodiment, a computer-readable medium is provided having stored thereon computer-readable instructions that when executed by a computing device, cause the computing device to transform high-dimensional data into low-dimensional data. (A) A distance matrix is computed. The distance matrix includes distance values computed between each pair of a plurality of observation vectors. Each observation vector of the plurality of observation vectors includes a variable value for each variable of a plurality of variables. (B) A kernel matrix is computed from the computed distance matrix using a bandwidth value. (C) The computed kernel matrix is decomposed using an eigen decomposition to define a plurality of eigenvalues. (D) A predefined number of largest eigenvalues are selected from the defined plurality of eigenvalues. (E) The selected, predefined number of largest eigenvalues of the defined plurality of eigenvalues are summed. (F) A next bandwidth value is computed based on the summed, predefined number of largest eigenvalues. (A) through (F) are repeated with the computed next bandwidth value as the bandwidth value until a stop criterion is satisfied. Each observation vector of the plurality of observation vectors is transformed into a second space using a kernel principal component analysis with the computed next bandwidth value and the kernel matrix computed using the computed next bandwidth value. The second space has a dimension defined by the predefined number of first eigenvalues. Each transformed observation vector of the plurality of observation vectors is output.

In another example embodiment, a computing device is provided. The computing device includes, but is not limited to, a processor and a computer-readable medium operably coupled to the processor. The computer-readable medium has instructions stored thereon that, when executed by the processor, cause the computing device to transform high-dimensional data into low-dimensional data.

In yet another example embodiment, a method of transforming high-dimensional data into low-dimensional data is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 5C shows a reconstruction of the USPS real-world dataset after adding noise using the bandwidth value computed using operations of the transformation application of FIG. 2 in accordance with an illustrative embodiment.

FIG. 5D shows a reconstruction of the USPS real-world dataset after adding noise using the bandwidth value computed by an existing method in accordance with an illustrative embodiment.

FIG. 5E shows a reconstruction of the USPS real-world dataset after adding noise using the bandwidth value computed by a modification of the existing method in accordance with an illustrative embodiment.

DETAILED DESCRIPTION

Figure 1:
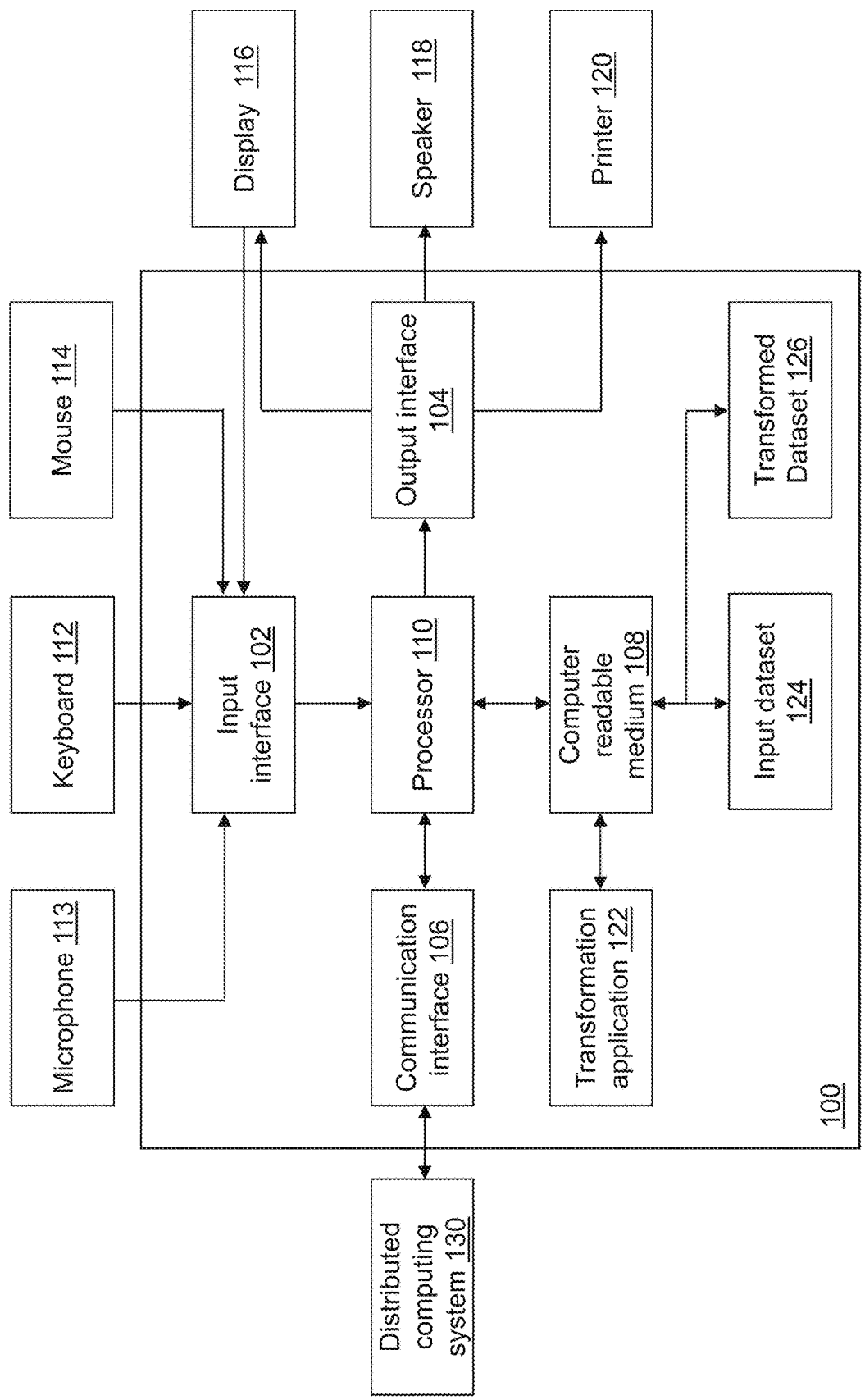
FIG. 1 depicts a block diagram of a transformation device in accordance with an illustrative embodiment.

Referring to FIG. 1, a block diagram of a transformation device 100 is shown in accordance with an illustrative embodiment. Transformation device 100 may include an input interface 102, an output interface 104, a communication interface 106, a non-transitory computer-readable medium 108, a processor 110, a transformation application 122, input dataset 124, and a transformed dataset 126. Fewer, different, and/or additional components may be incorporated into transformation device 100.

Kernel principal component analysis (KPCA) shares the same underlying idea as PCA: KPCA projects data into a lower-dimensional space that captures the highest possible amount of variance in the data. Instead of performing a linear transformation of the data, KPCA expands the features by nonlinear transformations and then applies principal component analysis (PCA) in this transformed feature space, called reproducing kernel Hilbert space (RKHS). Exact KPCA requires a full construction of a kernel matrix and expensive eigen decomposition, with computational complexity $O(n^3)$, making it hard to apply to massive data sets. Fast computation of KPCA has been achieved by either using a sample of data points to construct a much smaller Gramian matrix or using feature maps to provide an approximate embedding of the RKHS in Euclidean space.

Because different bandwidth values correspond to different RKHS, it is difficult to incorporate bandwidth selection into any RKHS theory framework. However, in practice, the choice of the Gaussian kernel bandwidth is very important for almost all kernel-based methods. Bandwidth values that are either too large or too small for KPCA fail to serve the purpose of data visualization, dimension reduction, or anomaly detection. Transformation application 122 computes an optimized value for a bandwidth parameter used by a kernel in performing KPCA of a dataset. As a result, transformation application 122 provides improved dimension reduction as demonstrated using several datasets and shown using image reconstruction as discussed further below.

Figure 3A:
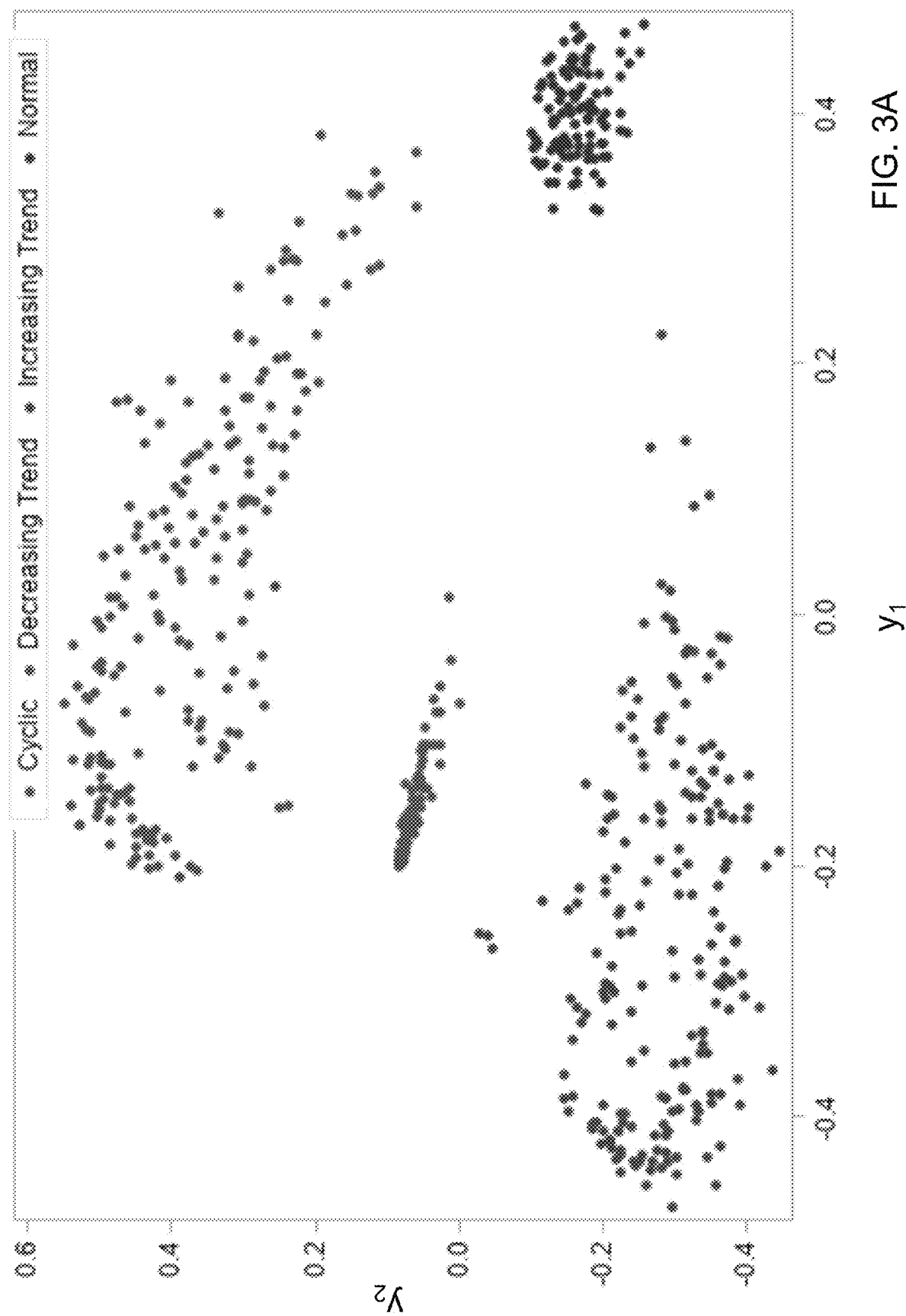
FIG. 3A provides transformation results with a first value of a bandwidth value for a first dataset in accordance with an illustrative embodiment.
Figure 3B:
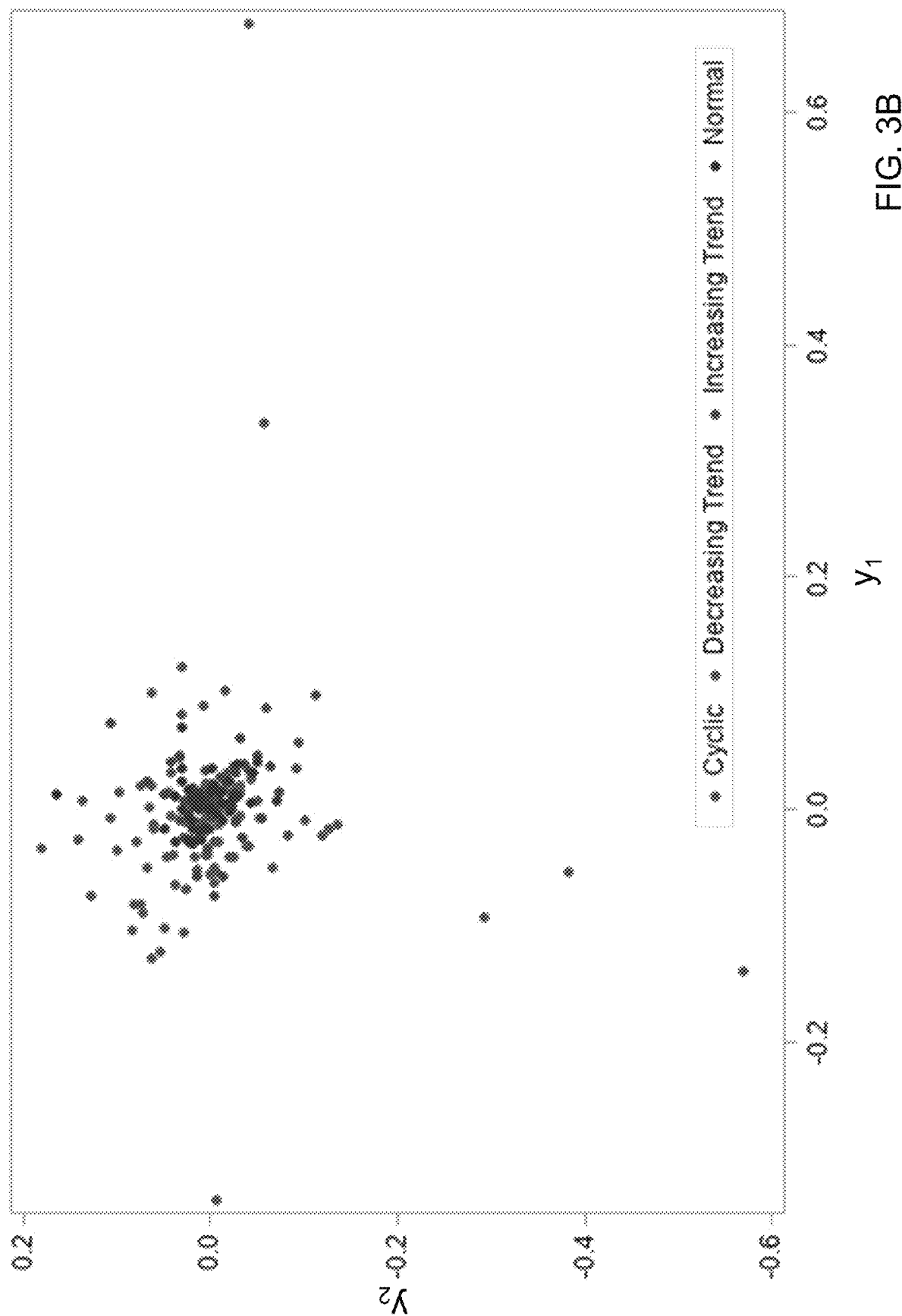
FIG. 3B provides transformation results with a second value of the bandwidth value for the first dataset in accordance with an illustrative embodiment.

For illustration, referring to FIG. 3A, a first dataset is shown with a transformation computed using KPCA with a bandwidth parameter value of 4. The first dataset includes statistical control chart time series data available in the University of California Irvine Machine Learning Repository. The colors indicate cluster assignments. Four types of data indicated as cyclic, decreasing trend, increasing trend, and normal are clearly distinguishable using the bandwidth parameter value of 4. In contrast, referring to FIG. 3B, the first dataset is shown with a transformation computed using KPCA with a bandwidth parameter value of 0.04. The four types of data are not distinguishable. A single cluster with a few outliers results using the bandwidth parameter value of 0.04.

Referring again to FIG. 1, input interface 102 provides an interface for receiving information from the user or another device for entry into transformation device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into transformation device 100 or to make selections presented in a user interface displayed on display 116.

The same interface may support both input interface 102 and output interface 104. For example, display 116 comprising a touch screen provides a mechanism for user input and for presentation of output to the user. Transformation device 100 may have one or more input interfaces that use the same or a different input interface technology. The input interface technology further may be accessible by transformation device 100 through communication interface 106.

Output interface 104 provides an interface for outputting information for review by a user of transformation device 100 and/or for use by another application or device. For example, output interface 104 may interface with various output technologies including, but not limited to, display 116, a speaker 118, a printer 120, etc. Transformation device 100 may have one or more output interfaces that use the same or a different output interface technology. The output interface technology further may be accessible by transformation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Transformation device 100 may have one or more communication interfaces that use the same or a different communication interface technology. For example, transformation device 100 may support communication using an Ethernet port, a Bluetooth antenna, a telephone jack, a USB port, etc. Data and/or messages may be transferred between transformation device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Transformation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Transformation device 100 also may have one or more drives that support the loading of a memory media such as a CD, DVD, an external hard drive, etc. One or more external hard drives further may be connected to transformation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Transformation device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Transformation application 122 performs operations associated with defining transformed dataset 126 from data stored in input dataset 124. Transformed dataset 126 includes a low-dimensional representation of observation vectors included in input dataset 124. For example, the low dimensional representation may be a transformation of the observation vectors included in input dataset 124 from high-dimensional data to two or three dimensions that can be graphically presented to understand how the observations included in input dataset 124 may be related. Such a visualization is not possible when directly using the observation vectors included in input dataset 124. The transformed observation vectors stored in transformed dataset 126 further may be clustered to present a visualization of the groupings of observation vectors included in input dataset 124 that may be used to classify or otherwise label the observation vectors included in input dataset 124. The classification or label may define a characteristic value associated with each observation vector included in input dataset 124. Some or all of the operations described herein may be embodied in transformation application 122. The operations may be implemented using hardware, firmware, software, or any combination of these methods.

Referring to the example embodiment of FIG. 1, transformation application 122 is implemented in software (comprised of computer-readable and/or computer-executable instructions) stored in computer-readable medium 108 and accessible by processor 110 for execution of the instructions that embody the operations of transformation application 122. Transformation application 122 may be written using one or more programming languages, assembly languages, scripting languages, etc. Transformation application 122 may be integrated with other analytic tools. As an example, transformation application 122 may be part of an integrated data analytics software application and/or software architecture such as that offered by SAS Institute Inc. of Cary, N.C., USA. Merely for illustration, transformation application 122 may be implemented using or integrated with one or more SAS software tools such as JMP®, Base SAS, SAS® Enterprise Miner™, SAS/IML®, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Transformation application 122 may be implemented as a Web application. For example, transformation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables defines a vector $x_i$ for each observation vector $i=1,2,\ldots,N$, where N is a number of the observation vectors included in input dataset 124. Each vector $x_i = \{x_1, x_2, \ldots, x_{N_v}\}$ includes a variable value for each variable, where $N_v$ is a number of the plurality of variables. Input dataset 124 may include additional variables that are not included in the plurality of variables. One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to transformation device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and/or abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 130 and accessed by transformation device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on transformation device 100 or on distributed computing system 130. Transformation device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art.

The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
FIG. 2 depicts a flow diagram illustrating examples of operations performed by a transformation application of the transformation device of FIG. 1 in accordance with an illustrative embodiment.

Referring to FIG. 2, example operations associated with transformation application 122 are described. Additional, fewer, or different operations may be performed depending on the embodiment of transformation application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute transformation application 122, which causes presentation of a first user interface window, which may include a plurality of menus and selectors such as drop-down menus, buttons, text boxes, hyperlinks, etc. associated with transformation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by transformation application 122. The operations of transformation application 122 further may be performed in parallel using a plurality of threads and/or a plurality of worker computing devices.

Referring to FIG. 2, in an operation 200, a first indicator may be received that indicates input dataset 124. For example, the first indicator indicates a location and a name of input dataset 124. As an example, the first indicator may be received by transformation application 122 after selection from a user interface window or after entry by a user into a user interface window. In an alternative embodiment, input dataset 124 may not be selectable. For example, a most recently created dataset may be used automatically.

In an operation 202, a second indicator may be received that indicates the plurality of variables or features to include when transforming the observation vectors included in input dataset 124. For example, the second indicator may indicate a plurality of column numbers or a plurality of column names. As another option, all of the columns may be used by default. Each observation vector $x_i$, i=1, . . . , $N_V$ read from input dataset 124 may include a value for each variable of the plurality of variables to define $N_V$ dimensions or features. Input dataset 124 includes a set of observation vectors X=[$x_{j,i}$]=1,2, . . . , $N_V$, j=1,2, . . . , N. When a value for a variable of the plurality of variables is missing, the observation vector may not be included in the number of observation vectors N, a value may be computed for the missing variable.

In an operation 204, a third indicator of KPCA parameters may be received. For example, the third indicator indicates options associated with execution of KPCA. Illustrative parameters include whether to center and/or scale the observation vectors prior to execution of KPCA, whether to use an approximate method or an exact method, if the approximate method is used, parameters for the approximate method, an epsilon value to determine a rank of a kernel matrix, a number of threads used to perform KPCA, etc. The third indicator may be received by transformation application 122 after selection from a user interface window or after entry by a user into a user interface window. A default value for one or more of the parameters may further be stored, for example, in computer-readable medium 108 and used automatically by default or without a user selection.

In an operation 208, a fifth indicator of an initial bandwidth value $\sigma_{init}$ may be received. In an alternative embodiment, the fifth indicator may not be received. For example, a default value may be stored, for example, in computer-readable medium 108 and used automatically. In another alternative embodiment, the initial bandwidth value $\sigma_{init}$ may not be selectable. Instead, a fixed, predefined value may be used. For illustration, a default value for the initial bandwidth value $\sigma_{init}$ may be $\sigma_{init}=2$ though other values may be used. As another option, instead of specifying the initial bandwidth value $\sigma_{init}$, the fifth indicator may indicate a computation method for the initial value or a default computation method may be used by default or without a user selection. As an example, a computation method may be selected from "KT", "Modified KT", etc. When "KT" is indicated, the initial bandwidth value $\sigma_{init}$ is computed from the observation vectors included in input dataset 124 using $$\sigma_{init} = \sqrt{\frac{1}{2N(N-1)} \sum_{i,j=1}^{N} \|x_i - x_j\|^2}.$$

When "Modified KT" is indicated, the initial bandwidth value $\sigma_{init}$ is computed from the observation vectors included in input dataset 124 using $$\sigma_{init} = \sqrt{\frac{1}{4N(N-1)} \sum_{i,j=1}^{N} \|x_i - x_j\|^2}.$$

In an operation 210, a sixth indicator of a number of eigenvalues k may be received. In an alternative embodiment, the sixth indicator may not be received. For example, a default value may be stored, for example, in computer-readable medium 108 and used automatically. In another alternative embodiment, the value of the number of eigenvalues k may not be selectable. Instead, a fixed, predefined value may be used. For illustration, a default value for the number of eigenvalues k may be k=6 though other values may be used. The number of eigenvalues k should be large enough to identify a major variance pattern in the observation vectors in input dataset 124.

In an operation 212, a seventh indicator of an optimization method used to determine an optimum value for the bandwidth parameter may be received with any parameters that may be defined based on the optimization method. Any nonlinear optimization method may be used. For example, the seventh indicator indicates a name of an optimization method. The seventh indicator may be received by transformation application 122 after selection from a user interface window or after entry by a user into a user interface window. A default value for the optimization method may further be stored, for example, in computer-readable medium 108. As an example, an optimization method may be selected from "Newton-Raphson", "Conjugate Gradient", etc. Newton-Raphson indicates a Newton-Raphson algorithm for optimization as understood by a person of skill in the art. Conjugate Gradient indicates a conjugate gradient algorithm for optimization as understood by a person of skill in the art. Of course, the optimization method may be labeled or selected in a variety of different manners by the user as understood by a person of skill in the art. In an alternative embodiment, the optimization method may not be selectable, and a single optimization method is implemented by transformation application 122.

In an operation 214, a bandwidth parameter value $\sigma$ is initialized, for example using $\sigma = \sigma_{init}$.

In an operation 216, a kernel matrix is computed using a Euclidean distance function and the bandwidth parameter value $\sigma$. For example, the kernel matrix K is computed using $$K(x_i, x_j) = \exp\left(\frac{-D(x_i, x_j)}{2\sigma^2}\right), i=1, \ldots, N, j=1, \ldots N,$$

i=1, ... N, j=1, ... N, where $x_i$ is an $i^{th}$ observation vector of input dataset 124 defined using the variables selected in operation 202, $x_j$ is a $j^{th}$ observation vector of input dataset 124 defined using the variables selected in operation 202, $D(x_i, x_j)$ indicates a distance matrix, and N is a number of the observation vectors included in input dataset 124. For example, the distance matrix is computed using $D(x_i, x_j) = \|x_i - x_j\|^2$.

In an operation 218, a first number of eigenvalues k are computed from the kernel matrix K using eigen decomposition.

In an operation 220, a sum s of the first number of eigenvalues k is computed, for example, using $s = \Sigma_{i=1}^{k} e_i$, where $e_i$ is an $i^{th}$ eigenvalue. The bandwidth value $\sigma$ that has a maximum s of the first number of eigenvalues k is an ideal bandwidth value because it tends to explain a largest amount of variance in input dataset 124 based on the number of eigenvalues k indicated in operation 210.

In an operation 222, a next value of the bandwidth parameter a is computed using the optimization method indicated in operation 212. The optimization is computing the next value of the bandwidth parameter $\sigma$ based on maximizing the sum s of the first number of eigenvalues k. The first and/or second order derivatives used by the optimization method can be approximated using a finite difference method. As a function of the bandwidth parameter $\sigma$, s is a smooth function with a local maximum.

Figure 4A:
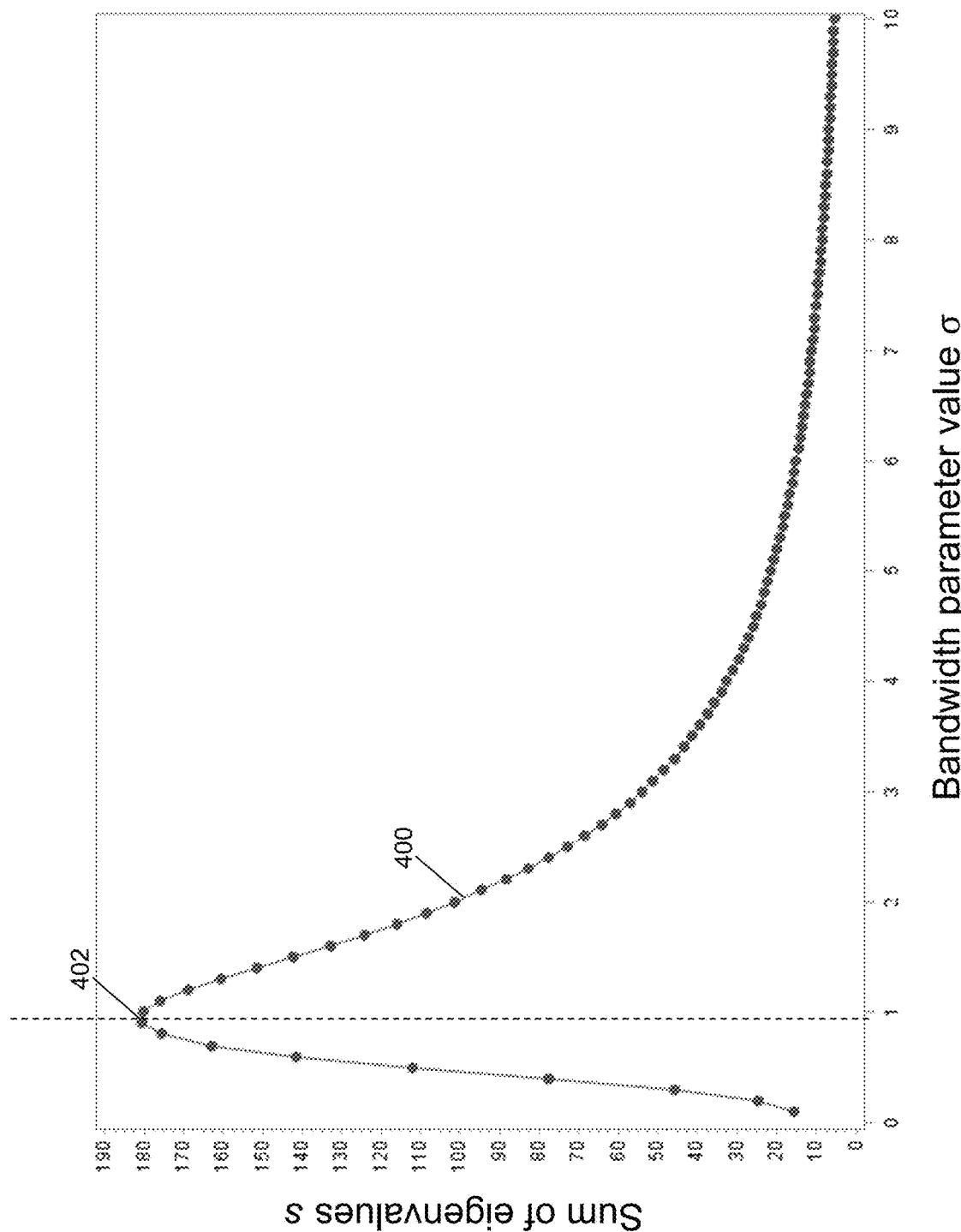
FIG. 4A provides a graph of an eigenvalue sum as a function of the bandwidth value for a second dataset in accordance with an illustrative embodiment.

For example, referring to FIG. 4A, a first curve 400 shows the sum s as a function of the bandwidth parameter $\sigma$ for a second dataset that includes simulated ten-dimensional hypersphere data with varying Gaussian noise levels. The number of eigenvalues k was selected as k=12. A first peak 402 indicates a maximum value for the sum s that indicates an optimum value $\sigma_{opt}$ for the bandwidth parameter $\sigma$, where operations 216 through 224 are iterating to the optimum solution.

Figure 4B:
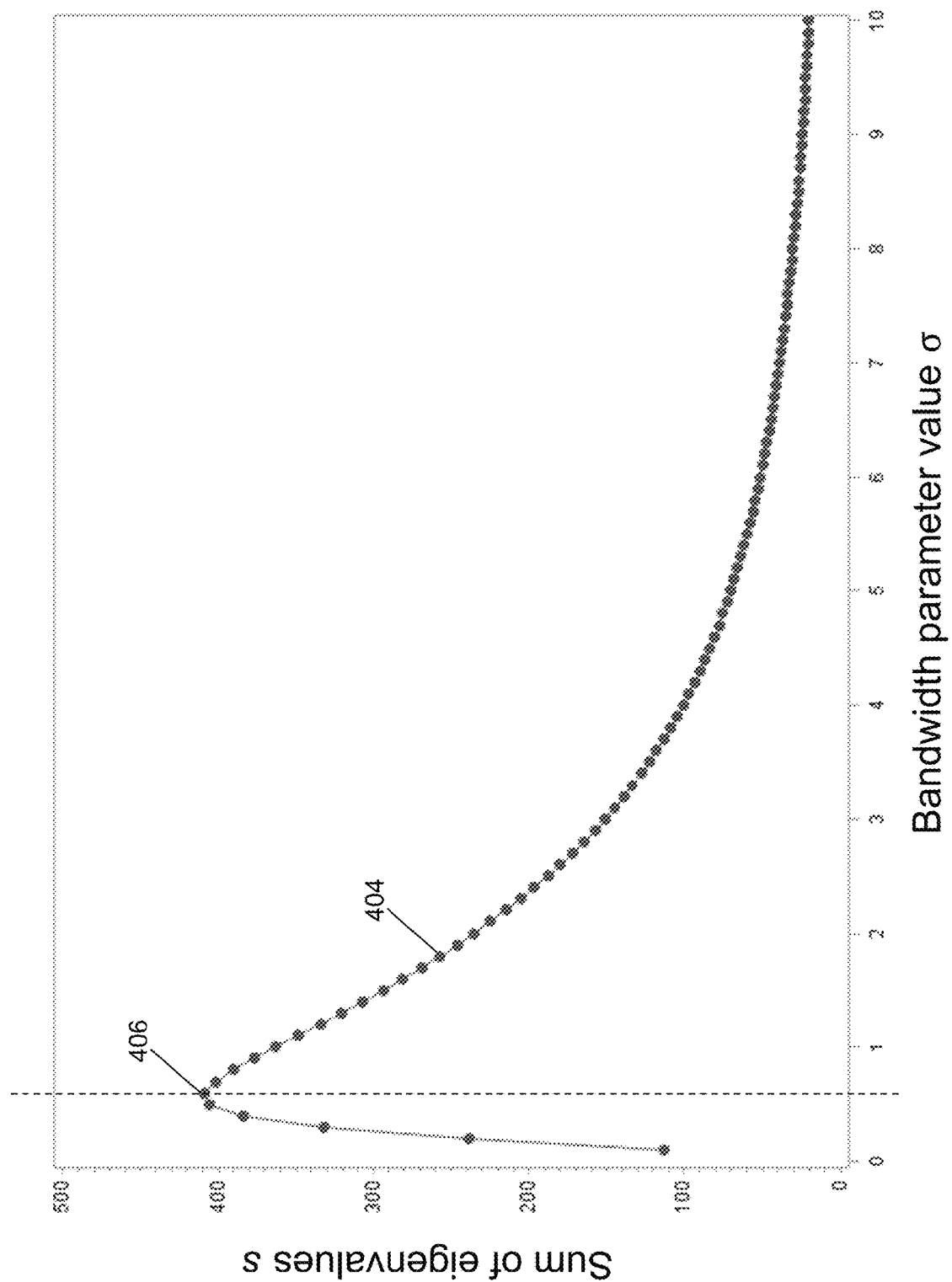
FIG. 4B provides a graph of the eigenvalue sum as a function of the bandwidth value for a third dataset in accordance with an illustrative embodiment.

For example, referring to FIG. 4B, a second curve 404 shows the sum s as a function of the bandwidth parameter $\sigma$ for a third dataset that includes simulated two-dimensional random polygon data with varying number of vertices and side lengths. The number of eigenvalues k was selected as k=16. A second peak 406 indicates the maximum value for the sum s that indicates the optimum value $\sigma_{opt}$ for the bandwidth parameter $\sigma$.

Figure 4C:
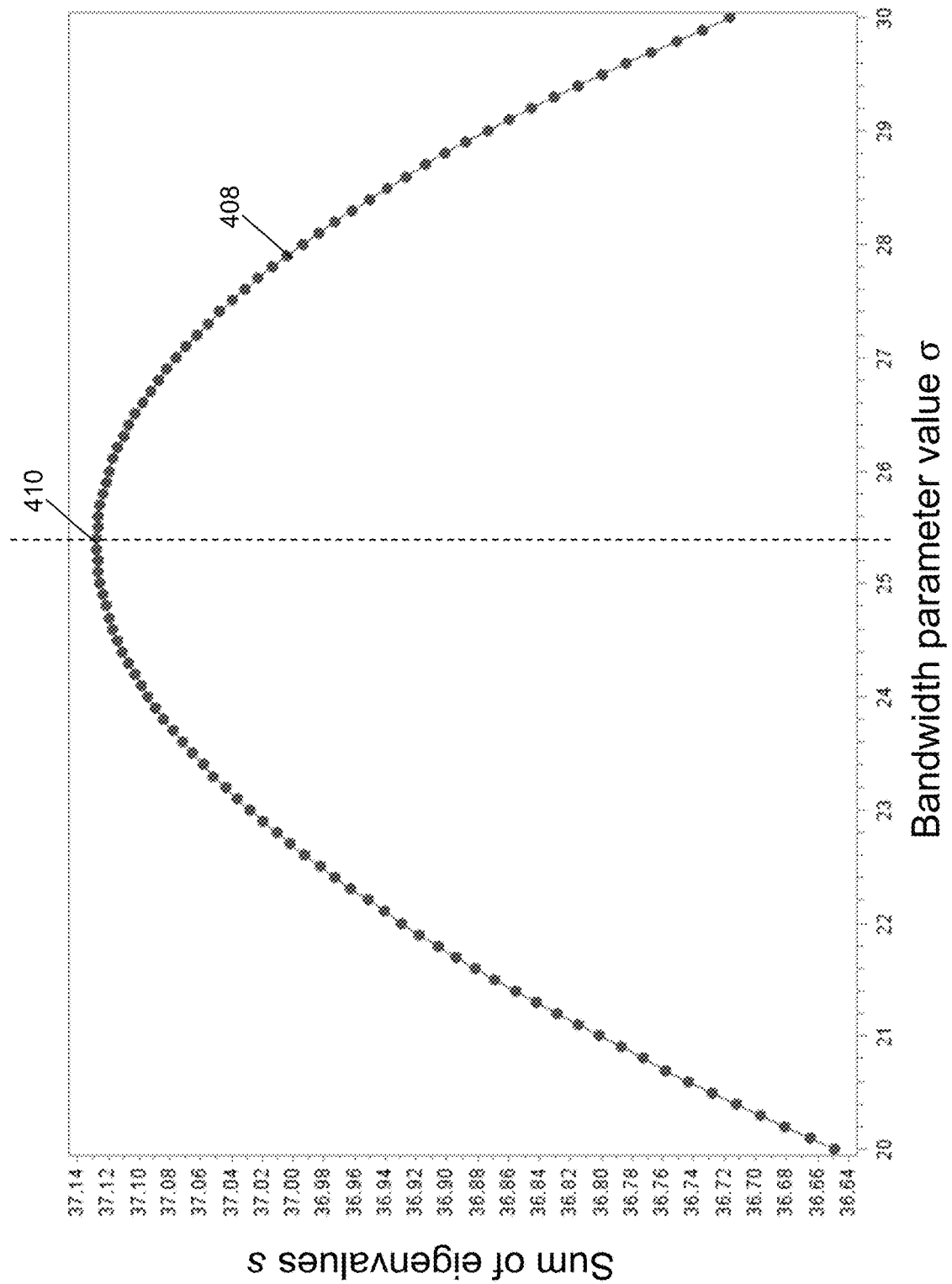
FIG. 4C provides a graph of the eigenvalue sum as a function of the bandwidth value for a fourth dataset in accordance with an illustrative embodiment.

For example, referring to FIG. 4C, a third curve 408 shows the sum s as a function of the bandwidth parameter $\sigma$ for a fourth dataset. The fourth dataset was an image shown referring to FIG. 5A. The first number of eigenvalues k was selected as k=35. A third peak 410 indicates the maximum value for the sum s that indicates the optimum value $\sigma_{opt}$ for the bandwidth parameter σ.

Referring again to FIG. 2, in an operation 224, a determination is made concerning whether the optimization method has computed the bandwidth parameter value σ that it is within a predefined tolerance value indicating that an optimized bandwidth parameter value $\sigma_{opt}$ has been computed. When the optimized bandwidth parameter value $\sigma_{opt}$ has been computed, processing continues in an operation 226. When the optimized bandwidth parameter value $\sigma_{opt}$ has not been computed, processing continues in operation 216 to compute a next kernel matrix. The optimization method is complete when a difference between the bandwidth value σ on a previous execution of operation 222 and the bandwidth value σ on a current execution of operation 222 is less than a predefined tolerance value. As another option, the optimization method is complete when a number of iterations of operation 222 exceeds a predefined maximum number of iterations of operation 222.

In operation 226, the observation vectors included in input dataset 124 are transformed using KPCA with the parameters indicated in operation 204 and using the optimized bandwidth parameter value $\sigma_{opt}$. For illustration, a KPCA procedure described in SAS® Visual Data Mining and Machine Learning 8.5 Procedures published by SAS Institute Inc., the assignee of the present application, in 2019 may be used, for example, with a radial basis function as a kernel type.

In an operation 228, a visualization of the transformed observation vectors may be provided, for example, on display 116. For example, the transformed observation vectors may be clustered and the clusters shown on display 116. For example, FIG. 3A shows the transformed observation vectors computed using the optimized bandwidth value $\sigma_{opt}$.

In operation 230, the transformed observation vectors may be output, for example, to transformed dataset 126. A cluster assignment may further be output in association with a respective observation vector when clustering is performed of the transformed observation vectors. Additionally, the optimized bandwidth parameter value $\sigma_{opt}$ may be output, for example, to transformed dataset 126.

A performance of transformation application 122 was evaluated. The performance of transformation application 122 in computing the optimized bandwidth value $\sigma_{opt}$ was compared to a KT bandwidth parameter value $\sigma_{kt}$ computed using $$\sigma_{kt} = \sqrt{\frac{1}{2n(n-1)} \sum_{i,j=1}^{n} \|x_i - x_j\|^2},$$

to a modified KT bandwidth parameter value $\sigma_{mkt}$ computed using $$\sigma_{mkt} = \sqrt{\frac{1}{4n(n-1)} \sum_{i,j=1}^{n} \|x_i - x_j\|^2},$$

and to a leave-one-out-cross-validation (LOOCV) bandwidth parameter value $\sigma_{loocv}$.

A reconstruction error with a KPCA projection as an objective loss function was used to evaluate the performance. In contrast with PCA, the reconstruction error of the KPCA projection is not straightforwardly applicable to KPCA because the Euclidean norm in RKHS is not comparable for different kernel bandwidths. To solve this problem, a pre-image of the KPCA projection was found in RKHS, which lies in the original input space. Here the pre-image is defined as an approximate inverse image of the feature map. After obtaining the pre-image, its reconstruction error $E_r$ can be computed in the input space using $E_r = \|z - x\|^2$, where x is a test observation vector, and z is a corresponding pre-image of x's KPCA projection in RKHS. Because the reconstruction error is computed with respect to the input space, these errors are comparable for different kernel bandwidth values.

The pre-image technique is useful in denoising applications where KPCA is used remove noise from noisy images to recover the image without noise. KPCA is useful in various fields such as data visualization, pattern recognition, data compression, image denoising, and novelty detection. The rationale behind this is that the directions of eigenvectors that correspond to small eigenvalues are assumed to contain only information about noise because small eigenvalues suggest small variances. In contrast, the leading eigenvectors that correspond to large eigenvalues are assumed to contain relevant pattern information. KPCA denoises the data by first applying linear PCA to the φ(x) in the feature space and then projecting the data onto the subspace spanned by the leading eigenvectors. However, these projections still lie in the feature space so they are mapped back to the input space to recover the denoised patterns. Note that the eigenvectors for KPCA, and hence the projections in the feature space, are expressed in terms of mapped input data $\Sigma_{i=1}^{N}\phi(x_i)$. The mapping φ(·) is usually nonlinear, and therefore, not necessarily invertible. Therefore, it cannot generally be guaranteed that the exact pre-image exists, and, in most cases, an approximate solution is used.

Using the radial basis function as the kernel type, one approximate solution for the pre-image problem is obtained by minimizing the Euclidean distance between φ(z) and the projection $P_j\phi(x)$ in the feature space, which is denoted by $$\underset{z}{\text{argmin}} \|\phi(z) - P_j\phi(x)\|^2.$$

The projection operator $P_j$ is given by $P_j\phi(x) = \Sigma_{j=1}^{k} \beta_j e_j$, where $e_j$ is a $j^{th}$ leading eigenvector of the covariance matrix, and $\beta_j$ is a $j^{th}$ projection of x onto $e_j$. For the radial basis function that satisfies K(x, x)=1 for all x in the input space, the minimization can be performed using fixed-point iterations.

The second dataset referenced above involved denoising a ten-dimensional hypersphere. The observations in the hypersphere data were uniformly distributed, and a random Gaussian noise with zero mean and standard deviation δ was added to the radius when generating each training and test observation. Four different values for standard deviation δ were used. The simulation study includes 100 iterations. For each iteration, a training dataset of 500 observations and a test dataset of 100 observations was generated. The denoising performance was measured by the mean reconstruction error between the denoised test dataset and the test dataset without noise. Table 1 below provides the mean reconstruction error and the associated standard error in parentheses obtained using k=12 principal components.

TABLE 1

| δ | $ME_{loocv}$ | $ME_{kt}$ | $ME_{mkt}$ | $ME_{opt}$ |
|---|---|---|---|---|
| 0.05 | 0.015 (0.0014) | 0.015 (0.0014) | 0.067 (0.0019) | 0.013 (0.0014) |
| 0.1 | 0.016 (0.0015) | 0.016 (0.0016) | 0.066 (0.0020) | 0.014 (0.0010) |
| 0.2 | 0.039 (0.0098) | 0.036 (0.0090) | 0.088 (0.0106) | 0.037 (0.0100) |
| 0.3 | 0.183 (0.0590) | 0.206 (0.0497) | 0.384 (0.0455) | 0.200 (0.1022) |

A mean reconstruction error calculated using $\sigma_{loocv}$ is indicated by $ME_{loocv}$, where $\sigma_{loocv}$ was computed using LOOCV between values of 0.1 and 3 with a step size of 0.1. A mean reconstruction error calculated using $\sigma_{kt}$ is indicated by $ME_{kt}$, where $\sigma_{kt}$ was computed $$\sqrt{\frac{1}{2n(n-1)}\sum_{i,j=1}^{n}\|x_i - x_j\|^2},$$

with the training dataset. A mean reconstruction error calculated using $\sigma_{mkt}$ is indicated by $ME_{mkt}$, where $\sigma_{mkt}$ was computed $$\sqrt{\frac{1}{4n(n-1)}\sum_{i,j=1}^{n}\|x_i - x_j\|^2},$$

with the training dataset. A mean reconstruction error calculated using $\sigma_{opt}$ is indicated by $ME_{opt}$, where $\sigma_{opt}$ was computed using operations 214 through 224 of transformation application 122 with the Euclidean distance function and the Newton-Raphson optimization method with finite differences used to compute the derivatives. The mean reconstruction error calculated using $\sigma_{opt}$ performed better that the other methods.

The third dataset involved denoising a two-dimensional polygon. The observations in the polygon data were computed using from 4 to 8 vertices. The vertices of each polygon were generated in a counterclockwise fashion as $r_1$ exp iθ(1), . . . , $r_j$ exp iθ(j), where j is the number of vertices, and θ(1)=1 and θ(i) for i=2, . . . N were the order statistics of an independent and identically distributed (iid) sample that is uniformly drawn from (0,2π). The $r_i$'s were uniformly drawn from an interval [3,5]. In the simulation study, for each number of vertices from 4 to 8, the corresponding random polygon was generated 100 times. The edges of each polygon were formed by 500 data points evenly distributed along each side. Gaussian noise with zero mean and standard deviation of σ=0.1 was added to the polygon to test the denoising performance measured by the reconstruction error. KPCA was applied to each noisy polygon, and the pre-image is fond from its high-dimensional feature space projection with 16 principal components. Given the pre-image in the input space, the mean reconstruction error between the clean polygon without noise and the pre-image was used as the objective loss function. The mean reconstruction errors were measured by the distance in the input space. Table 2 below provides the mean reconstruction error and the associated standard error in parentheses obtained using k=16 principal components.

TABLE 2

| j | $ME_{loocv}$ | $ME_{kt}$ | $ME_{mkt}$ | $ME_{opt}$ |
|---|---|---|---|---|
| 4 | 0.015 (0.0018) | 1.017 (0.1570) | 0.143 (0.0303) | 0.014 (0.0011) |
| 5 | 0.014 (0.0014) | 1.098 (0.1558) | 0.165 (0.0255) | 0.012 (0.0008) |
| 6 | 0.014 (0.0019) | 1.147 (0.1834) | 0.169 (0.0259) | 0.012 (0.0009) |
| 7 | 0.015 (0.0015) | 1.900 (0.2426) | 0.183 (0.0252) | 0.013 (0.0010) |
| 8 | 0.014 (0.0010) | 1.207 (0.1686) | 0.192 (0.0201) | 0.013 (0.0010) |

Again, the mean reconstruction error calculated using $\sigma_{opt}$ performed better or approximately the same as using LOOCV, which is much more time consuming, to compute.

A USPS real-world dataset was also used that contained 16×16 pixel labeled images of handwritten digits scanned by the US Postal Service. The pixel values were scaled to range from 0 to 1. There was a total of 9,298 digits, and each digit was represented by a 256-dimensional real value vector and the corresponding integer label. For each of the ten digits, 300 examples were randomly selected for the training dataset, and 50 examples were randomly selected for the test dataset. The test dataset was rendered noisy by Gaussian noise, characterized by zero mean and standard deviation σ=0.5. The denoising of the test dataset was performed using a variable number of principal components k=60, 70, 80, 90. Five-fold cross-validation (5CV) was used instead of LOOCV because LOOCV would be too expensive to run for this relatively large data set. The five-fold cross-validation was implemented values of 0.1 and 10 with a step size of 0.1. Table 3 below provides the mean reconstruction error obtained for each case.

TABLE 3

| k | $ME_{5cv}$ | $ME_{kt}$ | $ME_{mkt}$ | $ME_{opt}$ |
|---|---|---|---|---|
| 60 | 15.93 | 26.47 | 14.36 | 15.08 |
| 70 | 14.97 | 23.88 | 13.38 | 13.70 |
| 80 | 14.45 | 23.32 | 12.68 | 13.01 |
| 90 | 13.92 | 22.24 | 12.25 | 12.50 |

Again, the mean reconstruction error calculated using $\sigma_{opt}$ performed better than using 5CV, which is much more time consuming, to compute $\sigma_{5CV}$ and using $\sigma_{mkt}$.

Figure 5A:
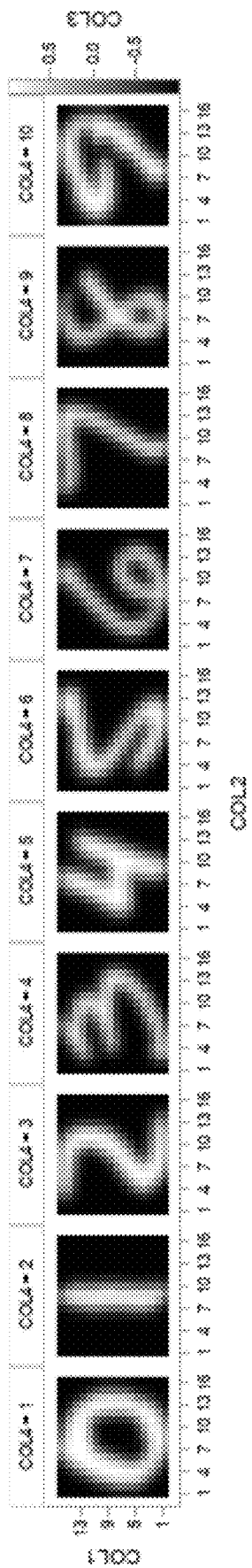
FIG. 5A shows a USPS real-world dataset in accordance with an illustrative embodiment.
Figure 5B:
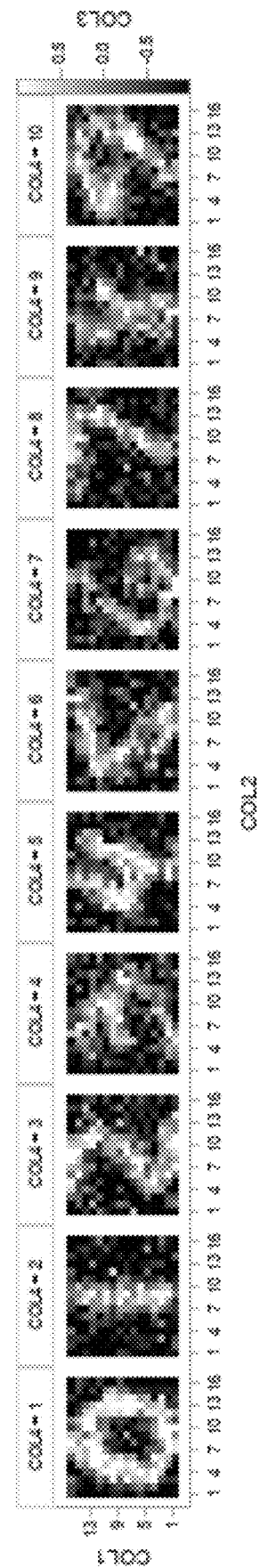
FIG. 5B shows the USPS real-world dataset after adding noise in accordance with an illustrative embodiment.

The USPS real-world dataset without noise is shown referring to FIG. 5A. The test dataset was rendered noisy by Gaussian noise and is shown referring to FIG. 5B. Referring to FIG. 5C, the USPS real-world dataset reconstructed using a is shown. Referring to FIG. 5D, the USPS real-world dataset reconstructed using $\sigma_{mkt}$ is shown. Referring to FIG. 5E, the USPS real-world dataset reconstructed using $\sigma_{kt}$ is shown. The reconstruction shown in FIG. 5C is noticeably clearer than the reconstructions shown in FIGS. 5D and 5E.

The fourth dataset was a real-world dataset that contained an original image of 200×150 pixels. The pixel values are scaled to range from 0 to 1. For the training dataset, a total of 50 such images with multiple levels of independent Gaussian noise were generated; the Gaussian noise has a mean of 0 and a standard deviation ranging from 0.1 to 0.5. Each image was considered as a vector with a length of 200×150=30000. Thus, the dimension of the training dataset was 50×30000. Another set of 50 images was generated with independent Gaussian noise for the test dataset. The Gaussian noise for the test dataset had a mean of 0 and a standard deviation σ ranging from 0.1 to 0.5. The reconstruction error of different methods on the test image data is evaluated using a variable number of principal components k=15, 25, 35. For LOOCV, the grid search was [5, 50] with a step size of 0.5. Table 4 below provides the mean reconstruction error obtained for each case.

TABLE 4

| k | $ME_{loocv}$ | $ME_{kt}$ | $ME_{mkt}$ | $ME_{opt}$ |
|---|---|---|---|---|
| 15 | 47.58 | 371.41 | 213.44 | 54.0 |
| 25 | 47.60 | 408.66 | 145.65 | 53.67 |
| 35 | 48.76 | 456.37 | 163.09 | 54.89 |

Again, the mean reconstruction error calculated using $\sigma_{opt}$ performed approximately the same as using LOOCV, which is much more time consuming, to compute.

Figure 6A:
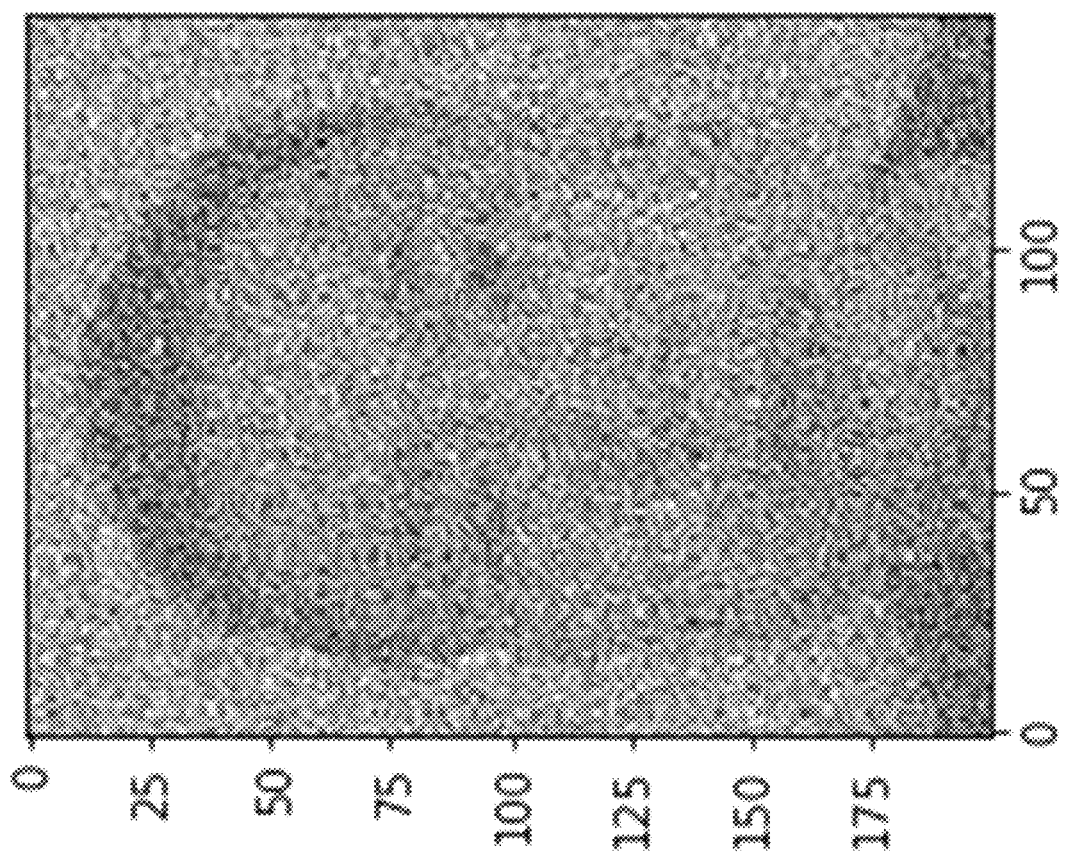
FIG. 6A shows the fourth dataset in accordance with an illustrative embodiment.
Figure 6B:
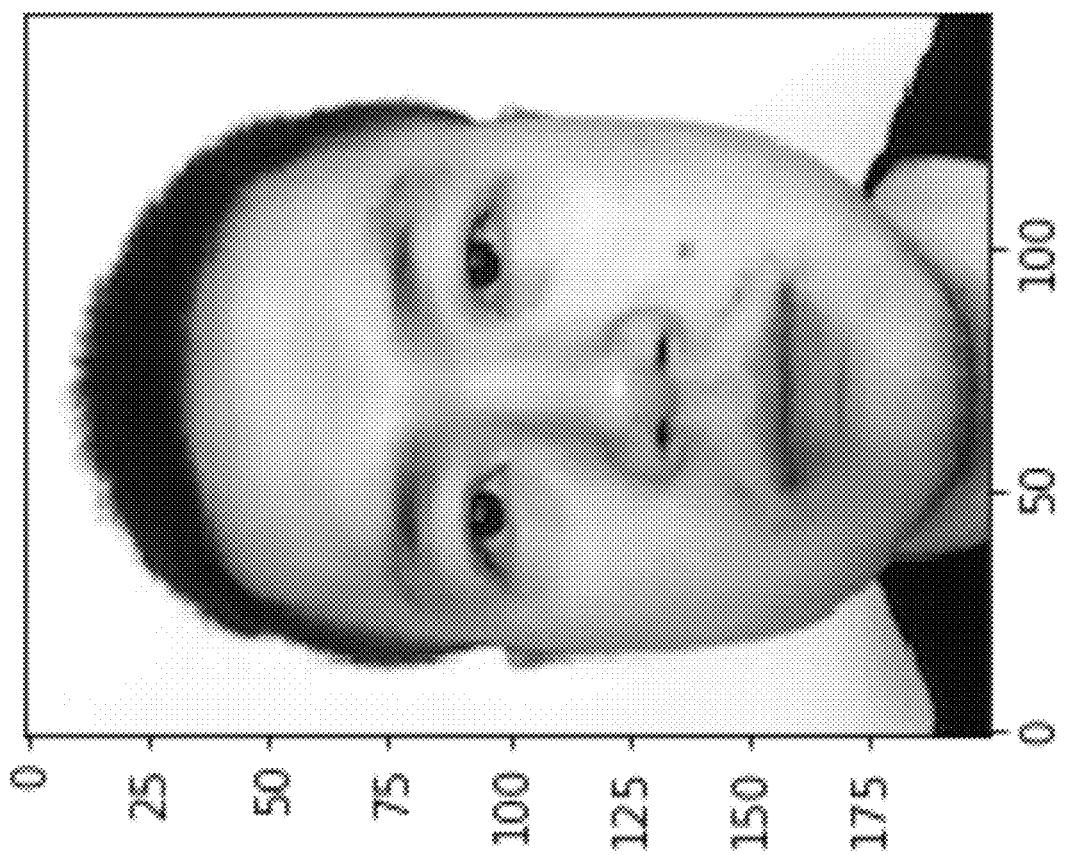
FIG. 6B shows the fourth dataset after adding noise in accordance with an illustrative embodiment.
Figure 6C:
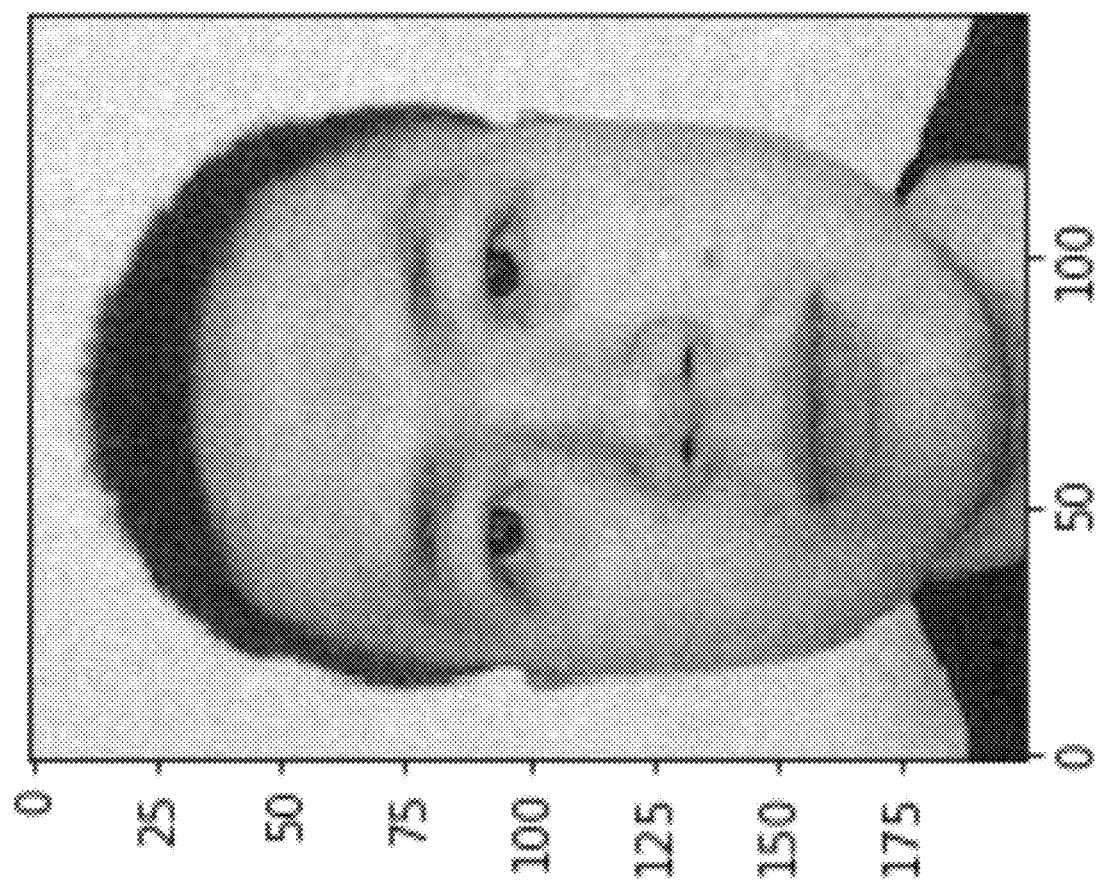
FIG. 6C shows a reconstruction of the fourth dataset after adding noise using the bandwidth value computed using operations of the transformation application of FIG. 2 in accordance with an illustrative embodiment.
Figure 6E:
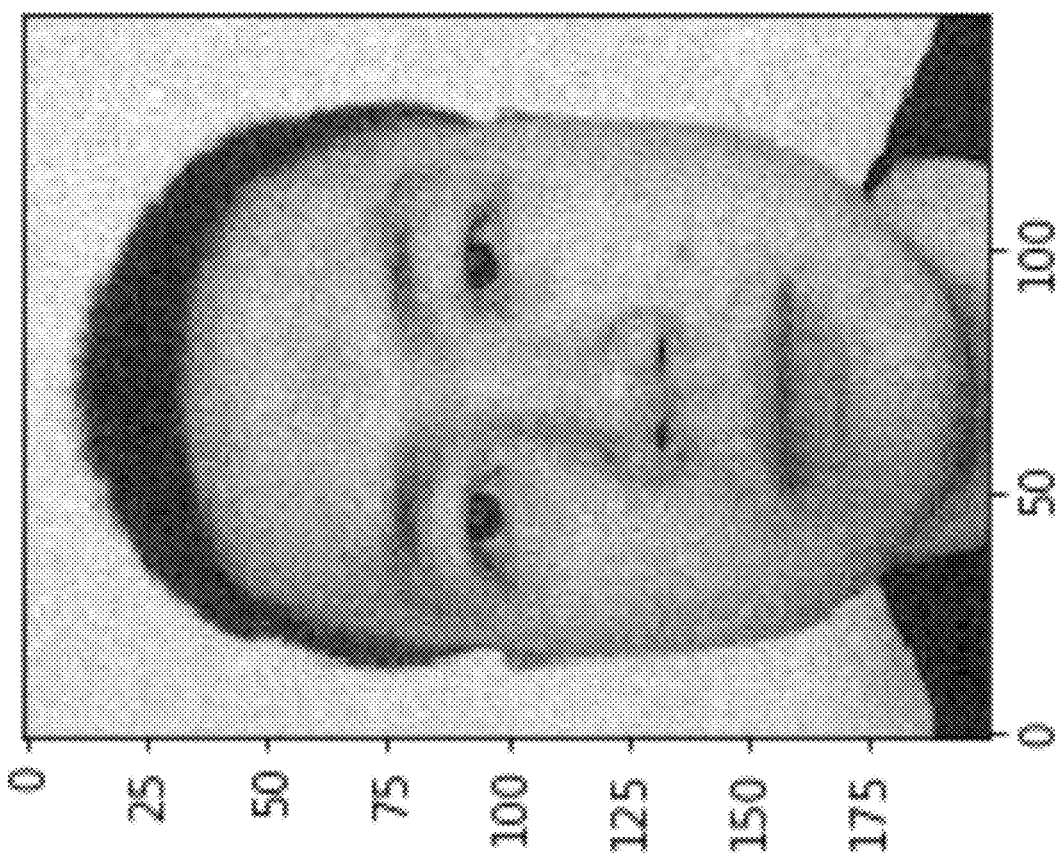
FIG. 6E shows a reconstruction of the fourth dataset after adding noise using the bandwidth value computed by a modification of the existing method in accordance with an illustrative embodiment.
Figure 6D:
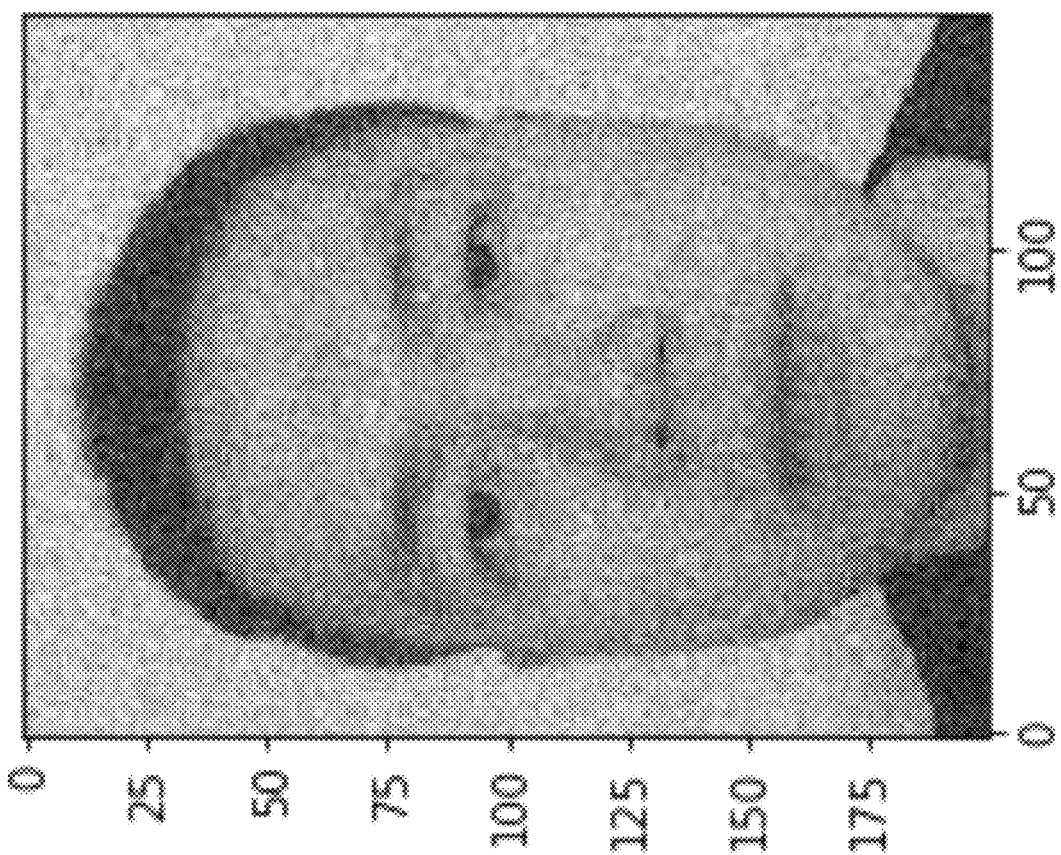
FIG. 6D shows a reconstruction of the fourth dataset after adding noise using the bandwidth value computed by an existing method in accordance with an illustrative embodiment.

The image is shown referring to FIG. 6A. Referring to FIG. 6B, the noisiest test dataset image is shown. Referring to FIG. 6C, the image reconstructed from the noisiest image using $\sigma_{opt}$ is shown. Referring to FIG. 6D, the image reconstructed from the noisiest image using $\sigma_{kt}$ is shown. Referring to FIG. 6E, the image reconstructed from the noisiest image using $\sigma_{mkt}$ is shown. The reconstruction shown in FIG. 6C is noticeably clearer than the reconstructions shown in FIGS. 6D and 6E as further shown based on the mean reconstruction errors included in Table 4.

There are applications for transformation application 122 in many areas such as process control and equipment health monitoring, image processing and classification, data segmentation, data analysis, voice processing and recognition, etc. The presented results demonstrate improved identification of meaningful subclusters that were similar but had distinguishable characteristics. The explosion of digital data is generating many opportunities for big data analytics, which in turn provides many opportunities for training cluster models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

(A) compute a distance matrix, wherein the distance matrix includes distance values computed between each pair of a plurality of observation vectors, wherein each observation vector of the plurality of observation vectors includes a variable value for each variable of a plurality of variables;

(B) compute a kernel matrix from the computed distance matrix using a bandwidth value;

(C) decompose the computed kernel matrix using an eigen decomposition to define a plurality of eigenvalues;

(D) select a predefined number of largest eigenvalues from the defined plurality of eigenvalues;

(E) sum the selected, predefined number of largest eigenvalues of the defined plurality of eigenvalues;

(F) compute a next bandwidth value based on the summed, predefined number of largest eigenvalues;

repeat (A) through (F) with the computed next bandwidth value as the bandwidth value until a stop criterion is satisfied;

transform each observation vector of the plurality of observation vectors into a second space using a kernel principal component analysis with the computed next bandwidth value and the kernel matrix computed using the computed next bandwidth value, wherein the second space has a dimension defined by the predefined number of largest eigenvalues; and output each transformed observation vector of the plurality of observation vectors.

2. The non-transitory computer-readable medium of claim 1, wherein the dimension of the second space is less than a number of the plurality of variables.

3. The non-transitory computer-readable medium of claim 1, wherein the predefined number of largest eigenvalues is two or three.

4. The non-transitory computer-readable medium of claim 1, wherein the stop criterion is satisfied when a difference between the bandwidth value on a previous execution of (F) and the bandwidth value on a current execution of (F) is less than a predefined tolerance value.

5. The non-transitory computer-readable medium of claim 1, wherein the stop criterion is satisfied when a number of iterations of (F) exceeds a predefined maximum number of iterations of (F).

6. The non-transitory computer-readable medium of claim 1, wherein the computer-readable instructions further cause the computing device to output the bandwidth value computed on a last iteration of (F).

7. The non-transitory computer-readable medium of claim 1, wherein the computer-readable instructions further cause the computing device to present a visualization of each transformed observation vector of the plurality of observation vectors in a display.

8. The non-transitory computer-readable medium of claim 1, wherein the computer-readable instructions further cause the computing device to train a clustering model with each transformed observation vector of the plurality of observation vectors to define a plurality of clusters in the second space, wherein each observation vector of the plurality of observation vectors is assigned to a single cluster, and to present a visualization of the defined plurality of clusters in a display.

9. The non-transitory computer-readable medium of claim 1, wherein the distance matrix is computed using a Euclidean distance function.

10. The non-transitory computer-readable medium of claim 1, wherein the kernel matrix is computed using $$K(x_i, x_j) = \exp\left(\frac{-D(x_i, x_j)}{2\sigma^2}\right), i = 1, \ldots, N, j = 1, \ldots N,$$

where $x_i$ is an $i^{th}$ observation vector of the plurality of observation vectors, $x_j$ is a $j^{th}$ observation vector of the plurality of observation vectors, $D(x_i, x_j)$ is the distance matrix, $\sigma$ is the bandwidth value, and N is a number of the observation vectors included in the plurality of observation vectors.

11. The non-transitory computer-readable medium of claim 1, wherein the distance matrix is computed using $D(x_i,x_j)=\|x_i-x_1\|^2$, where $x_i$ is an $i^{th}$ observation vector of the plurality of observation vectors, $x_j$ is a $j^{th}$ observation vector of the plurality of observation vectors, and $\|\ \|$ indicates a Euclidean norm.

12. The non-transitory computer-readable medium of claim 1, wherein the next bandwidth value is computed using a Newton-Raphson method.

13. The non-transitory computer-readable medium of claim 1, wherein repeating (A) through (F) until the stop criterion is satisfied is searching for the bandwidth value that maximizes a value of the summed, predefined number of largest eigenvalues.

14. The non-transitory computer-readable medium of claim 1, wherein, before (A), the computer-readable instructions further cause the computing device to compute the bandwidth value using $$\sigma = \sqrt{\frac{1}{2N(N-1)}\sum_{i,j=1}^{N}\|x_i - x_j\|^2},$$

where $\sigma$ is the bandwidth value, $x_i$ is an $i^{th}$ observation vector of the plurality of observation vectors, $x_j$ is a $j^{th}$ observation vector of the plurality of observation vectors, and N is a number of the observation vectors included in the plurality of observation vectors.

15. The non-transitory computer-readable medium of claim 1, wherein, before (A), the computer-readable instructions further cause the computing device to compute the bandwidth value using $$\sigma = \sqrt{\frac{1}{4N(N-1)}\sum_{i,j=1}^{N}\|x_i - x_j\|^2},$$

where $\alpha$ is the bandwidth value, $x_i$ is an $i^{th}$ observation vector of the plurality of observation vectors, $x_j$ is a $j^{th}$ observation vector of the plurality of observation vectors, and N is a number of the observation vectors included in the plurality of observation vectors.

16. A computing device comprising:
a processor; and
a computer-readable medium operably coupled to the processor, the computer-readable medium having computer-readable instructions stored thereon that, when executed by the processor, cause the computing device to
(A) compute a distance matrix, wherein the distance matrix includes distance values computed between each pair of a plurality of observation vectors, wherein each observation vector of the plurality of observation vectors includes a variable value for each variable of a plurality of variables;
(B) compute a kernel matrix from the computed distance matrix using a bandwidth value;
(C) decompose the computed kernel matrix using an eigen decomposition to define a plurality of eigenvalues;
(D) select a predefined number of largest eigenvalues from the defined plurality of eigenvalues;
(E) sum the selected, predefined number of largest eigenvalues of the defined plurality of eigenvalues;
(F) compute a next bandwidth value based on the summed, predefined number of largest eigenvalues;
repeat (A) through (F) with the computed next bandwidth value as the bandwidth value until a stop criterion is satisfied;
transform each observation vector of the plurality of observation vectors into a second space using a kernel principal component analysis with the computed next bandwidth value and the kernel matrix computed using the computed next bandwidth value, wherein the second space has a dimension defined by the predefined number of largest eigenvalues; and
output each transformed observation vector of the plurality of observation vectors.

17. A method of transforming high-dimensional data into low-dimensional data, the method comprising:
(A) computing, by a computing device, a distance matrix, wherein the distance matrix includes distance values computed between each pair of a plurality of observation vectors, wherein each observation vector of the plurality of observation vectors includes a variable value for each variable of a plurality of variables;
(B) computing, by the computing device, a kernel matrix from the computed distance matrix using a bandwidth value;
(C) decomposing, by the computing device, the computed kernel matrix using an eigen decomposition to define a plurality of eigenvalues;
(D) selecting, by the computing device, a predefined number of largest eigenvalues from the defined plurality of eigenvalues;
(E) summing, by the computing device, the selected, predefined number of largest eigenvalues of the defined plurality of eigenvalues;
(F) computing, by the computing device, a next bandwidth value based on the summed, predefined number of largest eigenvalues;
repeating, by the computing device, (A) through (F) with the computed next bandwidth value as the bandwidth value until a stop criterion is satisfied;
transforming, by the computing device, each observation vector of the plurality of observation vectors into a second space using a kernel principal component analysis with the computed next bandwidth value and the kernel matrix computed using the computed next bandwidth value, wherein the second space has a dimension defined by the predefined number of largest eigenvalues; and
outputting, by the computing device, each transformed observation vector of the plurality of observation vectors.

18. The method of claim 17, wherein the dimension of the second space is less than a number of the plurality of variables.

19. The method of claim 17, wherein the stop criterion is satisfied when a difference between the bandwidth value on a previous execution of (F) and the bandwidth value on a current execution of (F) is less than a predefined tolerance value.

20. The method of claim 17, wherein the predefined number of largest eigenvalues is two or three.

21. The method of claim 17, wherein the stop criterion is satisfied when a number of iterations of (F) exceeds a predefined maximum number of iterations of (F).

22. The method of claim 17, further comprising outputting, by the computing device, the bandwidth value computed on a last iteration of (F).

23. The method of claim 17, further comprising presenting, by the computing device, a visualization of each transformed observation vector of the plurality of observation vectors in a display.

24. The method of claim 17, further comprising training, by the computing device, a clustering model with each transformed observation vector of the plurality of observation vectors to define a plurality of clusters in the second space, wherein each observation vector of the plurality of observation vectors is assigned to a single cluster, and presenting, by the computing device, a visualization of the defined plurality of clusters in a display.

25. The method of claim 17, wherein the distance matrix is computed using a Euclidean distance function.

26. The method of claim 17, wherein the kernel matrix is computed using $$K(x_i, x_j) = \exp\left(\frac{-D(x_i, x_j)}{2\sigma^2}\right), i = 1, \ldots, N, j = 1, \ldots N,$$

i=1, . . . N, j=1, . . . N, where $x_i$ is an $i^{th}$ observation vector of the plurality of observation vectors, $x_j$ is a $j^{th}$ observation vector of the plurality of observation vectors, $D(x_i,x_j)$ is the distance matrix, $\sigma$ is the bandwidth value, and N is a number of the observation vectors included in the plurality of observation vectors.

27. The method of claim 17, wherein the distance matrix is computed using $D(x_i,x_j)=\|x_i-x_j\|^2$, where $x_i$ is an $i^{th}$ observation vector of the plurality of observation vectors, $x_j$ is a $j^{th}$ observation vector of the plurality of observation vectors, and $\| \|$ indicates a Euclidean norm.

28. The method of claim 17, wherein repeating (A) through (F) until the stop criterion is satisfied is searching for the bandwidth value that maximizes a value of the summed, predefined number of largest eigenvalues.

29. The method of claim 17, further comprising, before (A), computing, by the computing device, the bandwidth value using $$\sigma = \sqrt{\frac{1}{2N(N-1)}\sum_{i,j=1}^{N}\|x_i - x_j\|^2},$$

where $\sigma$ is the bandwidth value, $x_i$ is an $i^{th}$ observation vector of the plurality of observation vectors, $x_j$ is a $j^{th}$ observation vector of the plurality of observation vectors, and N is a number of the observation vectors included in the plurality of observation vectors.

30. The method of claim 17, further comprising, before (A), computing, by the computing device, the bandwidth value using $$\sigma = \sqrt{\frac{1}{4N(N-1)}\sum_{i,j=1}^{N}\|x_i - x_j\|^2},$$

where $\sigma$ is the bandwidth value, $x_i$ is an $i^{th}$ observation vector of the plurality of observation vectors, $x_j$ is a $j^{th}$ observation vector of the plurality of observation vectors, and N is a number of the observation vectors included in the plurality of observation vectors.

* * * * *

UNITED STATES PATENT AND TRADEMARK OFFICE
CERTIFICATE OF CORRECTION

PATENT NO. : 11,120,072 B1
APPLICATION NO. : 17/182424
DATED : September 14, 2021
INVENTOR(S) : Kai Shen et al.

Page 1 of 1

It is certified that error appears in the above-identified patent and that said Letters Patent is hereby corrected as shown below:

In the Specification

Column 10, Line 33:
Delete the phrase "$S = \sum_{i=1}^{k} e_i$," and replace with --$S = \sum_{i=1}^{k} e_i$,--.

Column 10, Lines 39-40:
Delete the phrase "bandwidth parameter a is computed" and replace with --bandwidth parameter $\sigma$ is computed--.

Column 12, Line 34:
Delete the phrase "$\sum_{i=1}^{N} \phi(x_i)$," and replace with --$\sum_{i=1}^{N} \alpha_i \phi(x_i)$,--.

Column 12, Line 48:
Delete the phrase "$P_j \phi(x) = \sum_{j=1}^{k} \beta_j e_j$," and replace with --$P_j \phi(x) = \sum_{j=1}^{k} \beta_j e_j$,--.

Column 14, Lines 45-46:
Delete the phrase "using a is shown." and replace with --using $\sigma_{opt}$ is shown.--.

In the Claims

Claim 11, Column 17, Line 17:
Delete the phrase "$D(x_i,x_j) = \|x_i - x_1\|^2$," and replace with --$D(x_i,x_j) = \|x_i - x_j\|^2$,--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*